2,900,359
Patented Aug. 18, 1959

2,900,359

INTERPOLYMERS OF ACRYLONITRILE, AN ALLYL ALCOHOL AND A STYRENE COMPOUND, PROCESS OF PREPARING SAME AND COATING COMPOSITION THEREFROM

Earl C. Chapin, Springfield, and Richard F. Smith, Ludlow, Mass., assignors to Monsanto Chemical Company, St. Louis, Mo., a corporation of Delaware No Drawing. Application January 10, 1955
Serial No. 481,004

8 Claims. (Cl. 260—43)

This invention relates to new terpolymer systems. More particularly, the invention relates to terpolymer systems containing alcohol groups.

One object of this invention is to provide polymeric systems containing alcohol groups.

Another object is to provide terpolymer systems containing aromatic nuclei nitrile radicals and alcohol groups.

These and other objects are attained by copolymerizing a styrene compound with an acrylonitrile and an allyl alcohol at elevated temperatures under autogenous pressure.

In the following examples which are illustrative of this invention, where parts are given they are parts by weight.

Example I

Mix together 50 parts of monomeric allyl alcohol, 25 parts of monomeric styrene, 25 parts of monomeric acrylonitrile and 2 parts of ditertiarybutyl peroxide. Heat the mixture in a closed pressure vessel at 150° C. for about 30 minutes. The product is an orange-colored syrup. Distill the product under vacuum to remove unreacted monomer. After distillation, the product is a brittle, orange-yellow solid which is soluble in acetone, methyl ethyl ketone, dimethyl formamide and hot xylene-butanol mixtures. Infra-red analysis shows the presence of benzene rings, nitrile groups and alcohol groups combined in the polymeric material.

Example II

Mix together 50 parts of allyl alcohol, 40 parts of styrene, 10 parts of acrylonitrile and 1 part of ditertiarybutyl peroxide. Pass the mixture through a continuous tubular pressure reactor at 200° C. at such a rate that the reactive material is in the reactor for about 25 minutes. The material emerging from the reactor is a syrupy solution of a polymeric material dissolved in unreacted monomer. The polymer may be recovered by distilling off the monomer under vacuum at about 100° C. The product is a light tan-colored, brittle solid soluble in acetone, dimethyl formamide and hot xylol-butanol mixtures. A 60% solution of the polymer in xylol-butanol mixture has a viscosity of about Z-5 on the Gardner-Holt scale. Infra-red analysis proves the presence of the benzene, nitrile and alcohol radicals in the polymer. The polymer contains about 54% combined styrene, 28% combined acrylonitrile and 18% combined allyl alcohol by weight.

Example III

Mix together 30 parts of allyl alcohol, 50 parts of styrene, 20 parts of acrylonitrile and 1 part of ditertiarybutyl peroxide. Polymerize the mixture at about 150° C. for about 25 minutes in a continuous tubular pressure reactor to obtain a syrupy solution of a polymeric material dissolved in unreacted monomer. Remove the monomer by vacuum distillation to obtain a hard, brittle, amber-colored solid soluble in acetone, dimethyl formamide and hot xylol-butanol mixtures. The polymer has a viscosity of about Z-10 on the Gardner-Holt scale as measured in a 60% solids xylol-butanol solution. The polymer contains about 68% combined styrene, 27% combined acrylonitrile and 5% combined allyl alcohol by weight.

The three components of the system of this invention are allyl alcohol, methallyl alcohol or mixtures thereof, acrylonitrile or alphamethacrylonitrile and styrene or ring-substituted alkyl or chloro styrenes. The allyl alcohol component may vary between 2 and 25% by weight of the terpolymer, the styrene component between 20 and 75% of the terpolymer and the acrylonitrile component between 5 and 70% of the terpolymer. The materials comprising the acrylonitrile component are acrylonitrile and methacrylonitrile. Among the materials comprising the styrene component are ortho, meta and para methyl, ethyl, butyl, etc., styrenes, ortho-para or ortho-meta dimethyl or diethyl styrenes, the mono-, di- and tri-chloro styrenes, ortho methyl para chloro styrene, etc. Mixtures of two or more materials of each component may be used.

In preparing the terpolymers of this invention, the three types of monomeric components should be mixed together with or without a free radical initiator and the mixture should then be heated at 100 to 250° C. in a closed reaction vessel under autogenous pressure. The reaction should be run for about 15 to 60 minutes to obtain conversions ranging from 30 to 70% depending on the conditions chosen. If desired, the monomers may be mixed with an inert solvent such as xylene before the polymerization step.

The reaction may be carried out in the presence of a free radical polymerization initiator such as ditertiarybutyl peroxide, benzoyl peroxide, tertiarybutyl perbenzoate, pinacolone peroxide, etc. The amount of initiator may vary between 0.1 and 5 parts per 100 parts of total monomer.

The products of the polymerization step are generally syrupy liquids which comprise a solution of the terpolymer in unreacted monomer and solvent if a solvent is used. The terpolymer is easily recovered from the syrup by removing unreacted monomer and solvent either by vacuum distillation or other conventional drying techniques. The terpolymers are generally hard, rather brittle materials having a color which ranges from a light amber to a deep orange. The terpolymers contain from about 1 to about 10% hydroxyl groups by weight.

The products of this invention are particularly useful in coating compositions as the main resin constituent thereof, with relatively minor amounts of other coating resins such as alkyd resins, phenol, urea and melamine formaldehyde coating resins, etc., or they may be used in relatively small amounts as modifiers for other coating resins. Furthermore, they may be esterified with drying oil acids to produce resins which will air dry. Among the most valuable coating compositions are the resins of this invention admixed with a minor amount of a methylol melamine ether.

Example IV

Prepare a 50% solids solution of the terpolymer of Example I in methyl ethyl ketone and a 50% solids solution of a trimethylol melamine butyl ether in methyl ethyl ketone. Mix together 7 parts of the terpolymer solution and 3 parts of the melamine ether solution until a clear homogeneous solution is obtained. From this solution, cast a film on a clean glass plate, dry the film in air at room temperature for a few minutes, e.g., about 20 minutes, and then heat the film at 150° C. for about 15 minutes. The cured film is hard, clear and insoluble in aromatic solvents.

Various pigments, fillers, dyes and other conventional additives may be added to solutions such as that of Example IV to yield coating compositions. Other organic solvents than methyl ethyl ketone may be used as a vehicle, e.g., other ketones, aromatic hydrocarbons, mixtures of aromatic hydrocarbons and aliphatic alcohols, etc.

The foregoing description and particularly the examples are illustrative of this invention and it is obvious that many variations may be made within the spirit and scope thereof.

What is claimed is:

1. A terpolymer consisting of an allyl alcohol component, a styrene component and an acrylonitrile component, the amount of allyl alcohol component in the terpolymer varying between 2 and 25% by weight, the amount of styrene component in the terpolymer varying between 20 and 75% by weight and the amount of acrylonitrile component in the terpolymer varying between 5 and 70% by weight; said terpolymer having been prepared by the process which comprises mixing the allyl alcohol component, the styrene component and the acrylonitrile component together and heating the resulting mixture to a temperature of 100–250° C. under autogenous pressure; said styrene component being a member of the group consisting of styrene, ring-substituted alkyl styrenes, ring-substituted chlorostyrenes, ring-substituted alkyl chlorostyrenes and mixtures thereof; said acrylonitrile component being a member of the group consisting of acrylonitrile, methacrylonitrile and mixtures thereof; and said allyl alcohol component being a member of the group consisting of allyl and methallyl alcohols and mixtures thereof.

2. A terpolymer as in claim 1 wherein the alcohol is allyl alcohol.

3. A terpolymer as in claim 1 wherein the styrene component is styrene.

4. A terpolymer as in claim 1 wherein the acrylonitrile component is acrylonitrile.

5. A process for preparing a terpolymer consisting of styrene, allyl alcohol and acrylonitrile which comprises preparing a mixture of 25–50% by weight of styrene, 30–50% by weight of allyl alcohol and 10–25% by weight of acrylonitrile and heating the resulting mixture to a temperature of 100–250° C. under autogenous pressure.

6. An interpolymer prepared by the method of claim 5.

7. A coating composition comprising an organic solvent solution of (1) a thermosetting resin taken from the group consisting of phenol-, urea- and melamine-formaldehyde condensation products and (2) a terpolymer of claim 1.

8. A coating composition as in claim 7 wherein the thermosetting resin is a butylated melamine-formaldehyde condensation product.

References Cited in the file of this patent

UNITED STATES PATENTS

| | | |
|---|---|---|
| 2,333,635 | Britton et al. | Nov. 9, 1943 |
| 2,588,890 | Shokal et al. | Mar. 11, 1952 |
| 2,598,316 | Tawney | May 27, 1952 |
| 2,624,722 | Kropa et al. | Jan. 6, 1953 |

FOREIGN PATENTS

| | | |
|---|---|---|
| 883,551 | France | Mar. 29, 1943 |